ROBERT W. NASH
INVENTOR

BY *Delbert P. Warner*

ATTORNEY

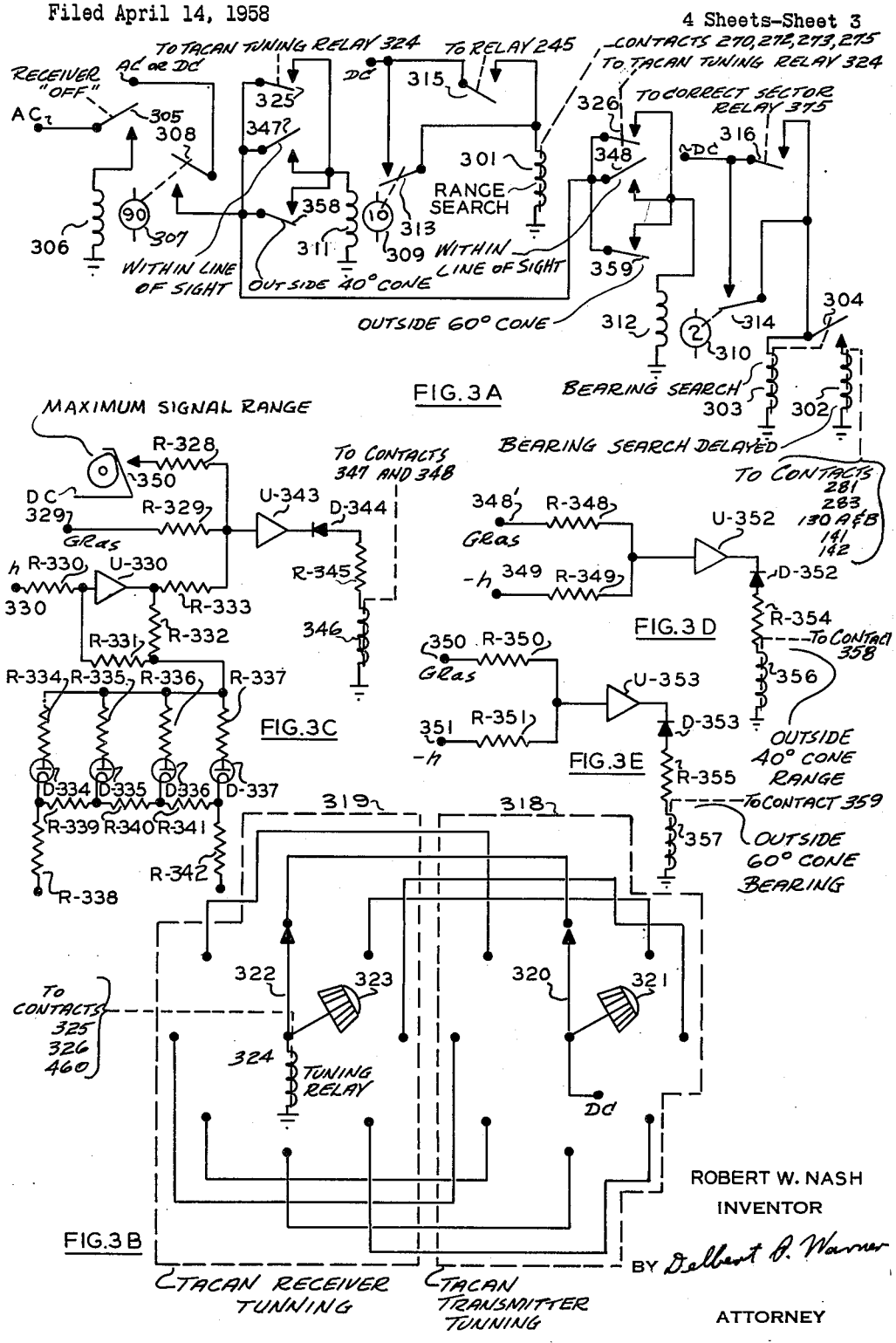

Oct. 3, 1961  R. W. NASH  3,002,291
TACAN SIMULATION
Filed April 14, 1958  4 Sheets-Sheet 4
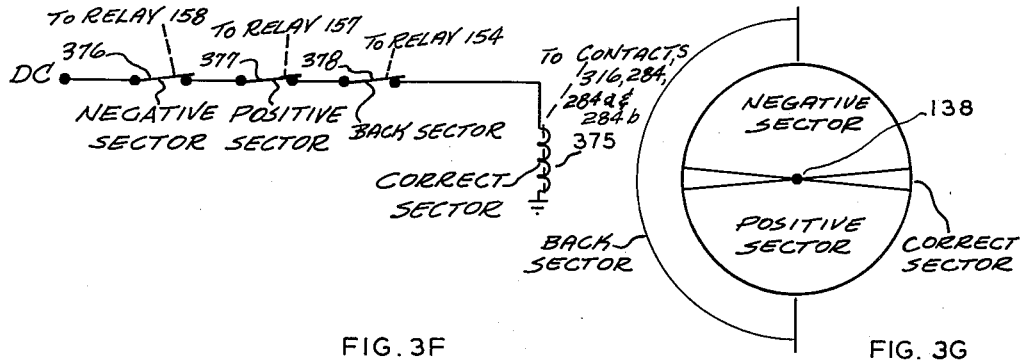
FIG. 3F  FIG. 3G
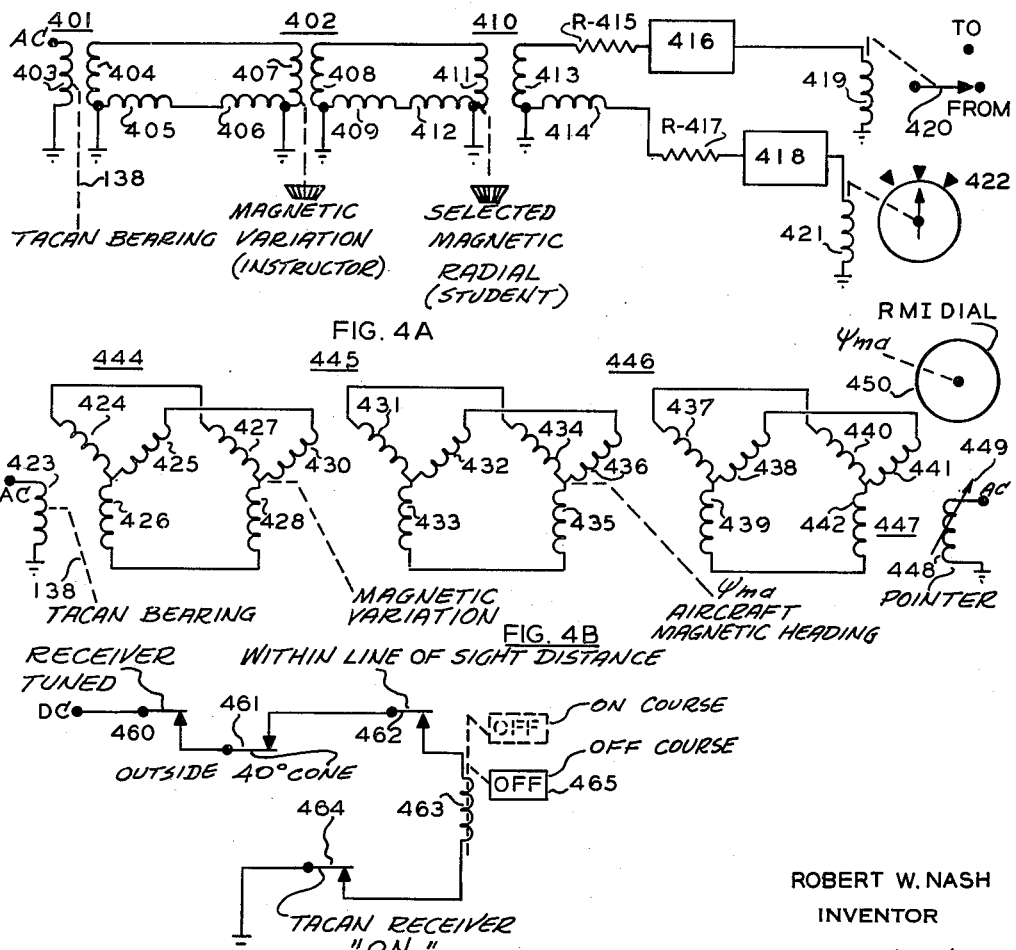
FIG. 4A
FIG. 4B
FIG. 4C
ROBERT W. NASH
INVENTOR
BY Delbert A. Warner
ATTORNEY United States Patent Office 3,002,291
Patented Oct. 3, 1961

3,002,291
TACAN SIMULATION
Robert W. Nash, Binghamton, N.Y., assignor to General Precision, Inc., a corporation of Delaware
Filed Apr. 14, 1958, Ser. No. 728,140
5 Claims. (Cl. 35—10.2)

The present invention relates to aerial navigation training apparatus and more particularly to grounded trainer apparatus for instructing and examining persons in the art of radio navigation. The invention finds particular utility as a simulator of Tacan and related radio navigational aids.

Among the prior art devices have been a number of trainers designed to simulate the characteristics of VOR or Visual Omni Range systems and also DME or Distance Measuring Equipment. An example of such a trainer is disclosed in the patent of Frankel et al. No. 2,709,308, issued on May 3, 1955, and assigned to the same assignee as the present application.

Many of the prior art devices have proven to be satisfactory for training in the older navigational systems which they were designed to simulate, but they are incapable of use in the simulation of the Tacan or Tactical Air Navigation System. This situation stems, of course, from the differences between these systems, Tacan being characterized by finer measuring of bearing in combination with more or less conventional DME, while the VOR systems were capable of only a relatively course bearing determination.

The prior art devices generally have not considered the problem of simulation of the cone of silence existing over the simulated radio beacon. In particular they have not provided means for simulating separate cones of silence existing in the bearing and the range propagation patterns.

Further characteristics, not considered nor simulated previously, include the time delays which have been inserted into the receiving equipment of Tacan for both bearing and range which keep the indicating devices in the operating condition during periods (characteristic of Tacan) when no radio energy is received from the ground station.

The prior art devices do not simulate the behaviour of the indicators as they operate with Tacan. For example, in Tacan the pointer of a radio magnetic indicator or RMI rotates counter-clockwise at a rate of about 4–6 revolutions per minute when it is operating, with a magnetic bearing input, in its search mode. When the Tacan receiver receives bearing information and switches to the tracking mode, the pointer will continue to rotate counter-clockwise until it reaches its proper position instead of rotating directly to the proper position as do many prior art devices.

The prior art devices have generally only simulated ground range or the distance between the simulated aircraft and the simulated radio station.

Numerous other features which the prior art devices either do not simulate or simulate in a less satisfactory manner, will be pointed out in the detailed disclosure. Among these is the fact that only the present simulator is capable of simulating the Vortac system, which is one in which bearing is taken from existing VOR equipment and range is determined from the range portions of Tacan.

It is therefore a primary object of the present invention to provide apparatus for providing a realistic simulation of the indications resulting from the use of aerial radio navigation equipment.

It is an additional object of the present invention to provide apparatus for the realistic simulation of the indications resulting from the use of Tacan.

It is a further object of the present invention to provide apparatus for the realistic simulation of bearing indications resulting from the use of Tacan in its search mode.

It is another object of the present invention to provide apparatus for the realistic simulation of range indications resulting from the use of Tacan in its search mode.

It is yet another object of the present invention to provide apparatus for the realistic and accurate simulation of range indications resulting from the use of Tacan in its tracking mode.

It is still another object of the present invention to provide apparatus for the realistic simulation of the effect of line of sight radio transmission on the indications resulting from the use of Tacan.

It is a further object of the present invention to provide apparatus useful for the realistic simulation of the indicators resulting from the use of Vortac.

It is still a further object of this invention to provide a simulator for accurate simulation of slant range computed from inputs representing ground coordinates and altitude.

The foregoing objects and others auxiliary thereto I prefer to attain by employing analogue techniques in connection with suitable indicating means. The analog techniques involve the provision of input voltages representing the simulated positions of a radio station and an airplane and the performance of various operations on these voltages to derive a shaft position proportional to bearing and a new voltage representing the distance between the radio station and the airplane. The two fundamental derived quantities, bearing and range, are then manipulated by certain analogue apparatus and combined with additional voltages or means for varying voltages representing such quantities as the desired course of flight and magnetic deviation to operate a wide range of simulated aircraft instruments.

The novel features of my invention are set forth with particularity in the appended claims. The invention itself, however, both as to its organization and its method of operation, together with additional objects and advantages thereof, will be best understood from the following description of a specific embodiment when read in connection with the accompanying drawings, in which:

FIG. 3A is a schematic diagram illustrating electrical relay circuitry suitable for switching the bearing and range systems shown in FIGS. 1 and 2 from tracking to searching modes and back again;

FIG. 3B is a simplified schematic of a tuning circuit useful in simulating the tuning steps in a Tacan system;

FIG. 3C is a schematic diagram illustrating electrical circuitry for determining whether the simulated aircraft has exceeded the simulated signal line of sight;

FIG. 3D is a schematic diagram illustrating electrical circuitry for determining whether the simulated aircraft is within the simulated cone of silence for the simulated range signal;

FIG. 3E is a schematic diagram illustrating electrical relay circuitry for simulating the condition when the simulated aircraft is in a simulated signal cone of silence for the simulated bearing signal;

FIG. 3F is a schematic diagram illustrating electrical relay circuitry for assuring that the bearing shaft of FIG. 1 rotates in a counter-clockwise direction during the transition from its searching to its tracking mode;

FIG. 3G shows a graph which is helpful in the description of the circuitry required to assure a realistic transition of the Tacan bearing indication from the searching to the tracking mode;

FIG. 4A is a schematic diagram illustrating conventional electrical circuitry which may be utilized to position the "To-From" and vertical needle indications of the conventional course deviation indicator;

FIG. 4B is a schematic diagram illustrating conventional electrical circuitry which may be utilized to position the dial and pointer of a conventional radio magnetic indicator; and FIG. 4C is a schematic of electrical circuitry which may be used to energize the "Off" flag of a conventional course deviation indicator.

Figure 1:
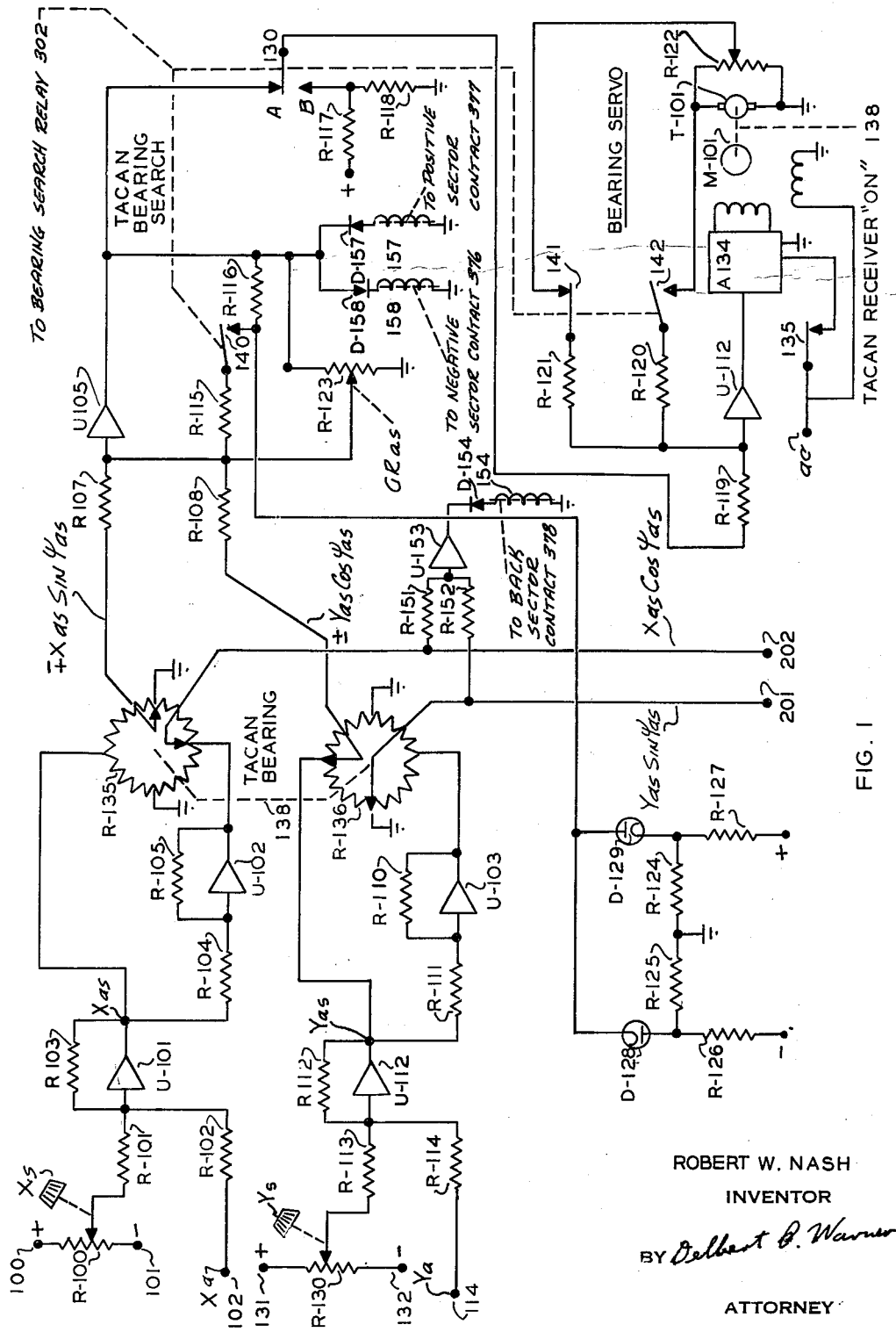
FIG. 1 is a schematic diagram of a portion of a Tacan simulator illustrating a portion of a coordinate converter employed in conjunction with a Tacan bearing simulator.

Referring first to FIG. 1 there is shown an exemplary embodiment of a conventional analog computer cartesian to polar coordinate converter of a type widely used in the flight trainer, instrumentation and fire control arts. Potentiometer R–100 is excited at its terminals 100 and 101 by positive and negative constant voltages from the trainer power supply. The wiper of potentiometer R–100 may be used by an attendant or instructor to select a desired voltage representative of the northerly distance $X_s$ of the simulated radio range station from a reference point. Potentiometer R–130 is similarly excited at its terminals 131 and 132 by positive and negative constant voltages and its wiper may be positioned by a control knob to select a desired easterly distance $Y_s$ of the simulated range station from the reference point. It should be noted that the settings of the $X_s$ (northerly) and $Y_s$ (easterly) voltages are always in the first quadrant. The polarity of these voltages is chosen in order to facilitate the translation of the axis and not to represent components of direction in other quadrants.

Voltages commensurate with simulated northerly $X_a$ and easterly $Y_a$ distances of the simulated aircraft from the reference point are derived by conventional grounded trainer apparatus, not shown, and applied to terminals 102 and 114, respectively. By way of example, these potentials may be computed as shown in copending application Serial Number 511,778 filed December 8, 1955, by John M. Hunt, entitled "Improved Grounded Flight Trainer" and assigned to the same assignee as the present application. In FIG. 1 the simulated aircraft component distances from the reference point are indicated by the dimensions $X_a$ and $Y_a$, and the selected simulated radio station component distances from the reference point are indicated by the dimensions $X_s$ and $Y_s$.

The polarity of voltages $X_a$, $Y_a$, $X_s$ and $Y_s$ is such that pairing them off and adding them, using amplifiers U–101 and U–112, will yield the values $X_{as}$ and $Y_{as}$ which represent the coordinates of the simulated airplane from axes which have been translated by an amount equal to $X_s$ and $Y_s$ so that the station is at the origin of the coordinate system. The voltages $X_{as}$ and $Y_{as}$, thus, represent the rectangular coordinates of the distance between the station and the aircraft.

The $X_{as}$ voltage from amplifier U–101 is applied directly and also via polarity-inverting amplifier U–102, to excite a 360 degree resolver R–135, and the $Y_{as}$ voltage from amplifier U–112 is applied directly and also via conventional polarity-inverting amplifier U–103 to excite a 360 degree resolver R–136. Polarity-inverting amplifier U–102 includes input resistor R–104 and feedback resistor R–105, while polarity-inverting amplifier U–103 includes input resistor R–111 and feedback resistor R–110.

The wiper arms of resolvers R–135 and R–136 are mechanically positioned (when the relay contacts are in the position shown in FIG. 1) by the output shaft position of a bearing servo in accordance with a measure of $\psi_{as}$, the angle between a reference direction (north) and the line between the simulated aircraft and the simulated radio range measured clockwise. A voltage commensurate with $\mp X_{as} \sin \psi_{as}$ appearing on the sine wiper of resolver R–135 is applied to summing amplifier U–105 through summing resistor R–107 and a voltage commensurate with $\pm Y_{as} \cos \psi_{as}$ from the cosine wiper of resolver R–136 is applied to summing amplifier U–105 through summing resistor R–108. Amplifier U–105 sums the two voltages to provide an error voltage to drive the bearing servo during the Tacan bearing tracking mode of operation. The tracking mode being the operation of the device while following the Tacan radial as distinguished from the search mode in which the device functions to find a radial. It should be noted that the tracking mode prevails when the relay contacts of the invention are in the positions shown in the figures.

Applying elementary trigonometry to this situation, it may be shown that $$X_{as} \sin \psi_{as} - Y_{as} \cos \psi_{as} = 0 \qquad (1)$$

This follows from the consideration that $\psi_{as}$ may be treated (with appropriate 90° or 180° decreases) as an angle of a particular right triangle in which $X_{as}$ and $Y_{as}$ are legs and $h$ is the hypotenuse with $Y_{as}$ as the side opposite the angle $\psi_{as}$. In such a triangle $$\sin \psi_{as} = \frac{Y_{as}}{h}$$

and $$\cos \psi_{as} = \frac{X_{as}}{h}$$

From these equalities it follows that $$\frac{\sin \psi_{as}}{Y_{as}} = \frac{\cos \psi_{as}}{X_{as}}$$

which may be simplified to form Equation 1.

From Expression 1 it may be understood that with input voltages $X_{as}$ and $Y_{as}$ applied to resolvers R–135 and R–136, the bearing servo will rotate so as to minimize the error signal from amplifier U–105 thereby providing an output shaft position commensurate with the simulated bearing angle $\psi_{as}$ between the simulated aircraft and the simulated radio station. This type of positioning apparatus is shown by Lovell et al. in Patent No. 2,404,387 issued on July 23, 1946.

FIG. 1 discloses several other features. Summing amplifier U–105 contains a feedback from its output to its input comprising potentiometer R–123 the wiper of which is positioned in accordance with the ground range $GR_{as}$ between the simulated aircraft and the simulated Tacan station. The purpose of this adjustable feedback is to adjust the gain of the amplifier with range in order that its sensitivity will remain substantially the same over wide differences of ground range during the tracking mode of operation.

The bearing servo provides a means for deriving a shaft position commensurate with the bearing of a simulated radio station (beacon) from a simulated aircraft during the tracking mode and may also rotate the same shaft position counterclockwise at a selected rate in order to simulate the search mode. A voltage commensurate with the instantaneous bearing between the simulated radio station and the simulated aircraft during the tracking mode is derived at the output terminal of amplifier U–105. When the Tacan system is in its tracking mode, this voltage is applied through closed contact 130A, and summing resistor R–119 to the input of summing amplifier U–112 of the bearing servo. In addition to the D.C. summing amplifier the exemplary bearing servo comprises a magnetic amplifier A–134, a two phase A.C. servo motor M–101. Tachometer T–101 and a tachometer potentiometer R–122. The potentiometer R–122 is connected in parallel with the output terminals of the tachometer.

The operation of the magnetic amplifier A–134 may be conventional since it takes the D.C. voltage output from U–112 and controls the magnitude and phase of the A.C. voltage applied to the control winding of the conventional two phase servo motor M-101. The reference winding of servomotor M-101 and the magnetic amplifier A-134 may be connected to the trainer A.C. power source. The switch contacts 135 between the A.C. source and the magnetic amplifier may be used to simulate the Tacan receiver on-off switch. With the bearing portion of the Tacan system in its tracking mode, the bearing servo operates as a position servo and positions its output shaft 138 in accordance with the output voltage of amplifier U-105. The follow-up step is provided by the output shaft 138 which positions the 360 degree resolvers R-135 and R-136 in a manner to drive the output voltage from U-105 to zero. A portion of the D.C. rate voltage appearing at the terminals of the tachometer T-101 is picked off at the wiper of parallel potentiometer R-122 and applied through closed relay contact 141 and through summing resistor R-121 to the input of summing amplifier U-112 to provide rate stabilization in a completely conventional manner.

Figure 2:
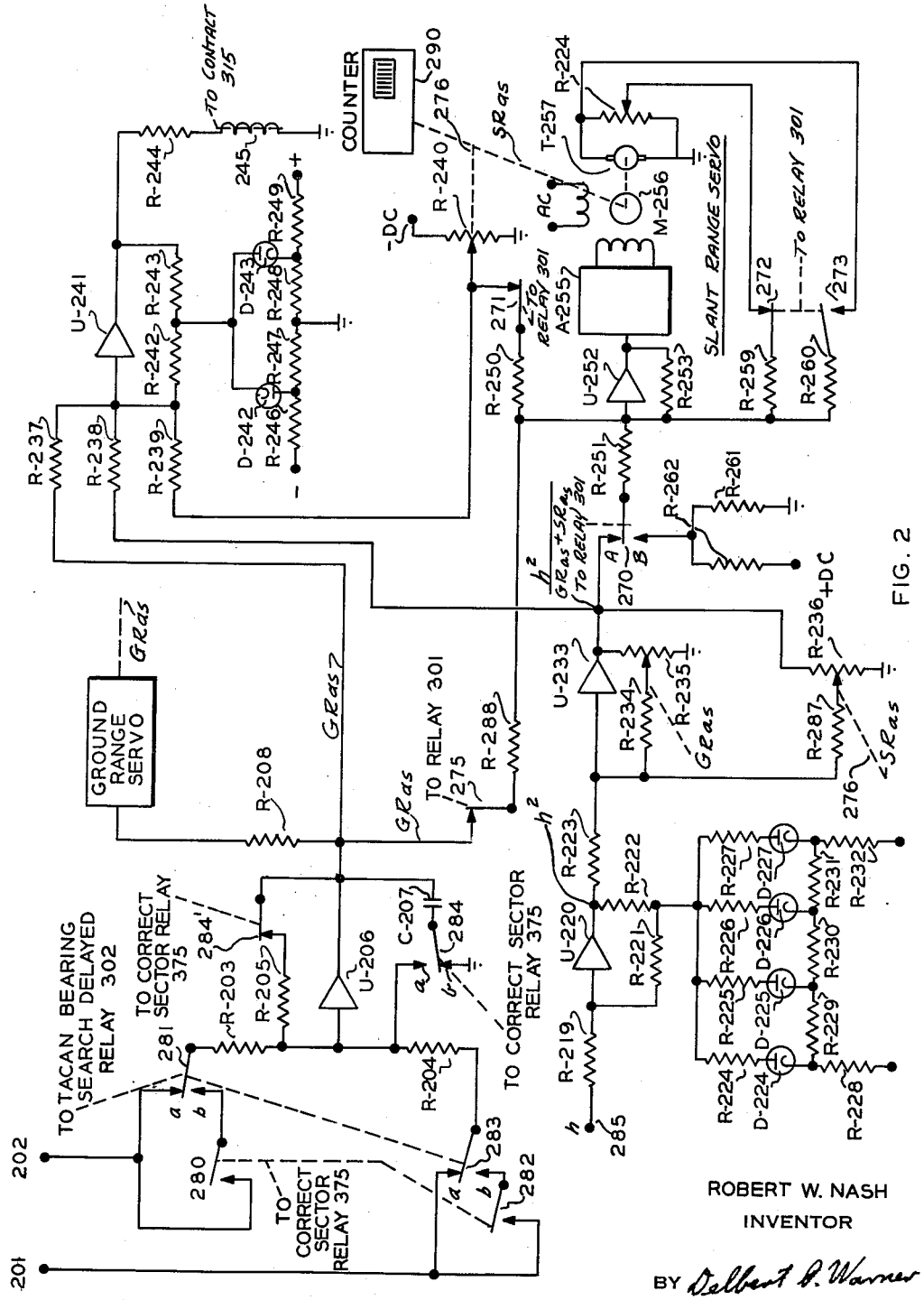
FIG. 2 is a schematic diagram of a further portion of the coordinate converter of FIG. 1 in combination with ground range and slant range computing apparatus.

Turning to FIG. 2, the voltages $\pm Y_{as} \sin \psi_{as}$ from the sine winding of resolver R-136 via terminal 201 and $\pm X_{as} \cos \psi_{as}$ from the cosine winding of resolver R-135 via terminal 202 are combined by summing amplifier U-206 to provide an output voltage proportional to the simulated horizontal distance or ground range $GR_{as}$ between the simulated aircraft and the simulated station, during the periods when the bearing servo is in its tracking mode. During these periods in the tracking mode the summing amplifier U-206 receives the above identified input voltages through input terminals 201 and 202 by way of relay contacts 281a and 283a, and summing resistors R-203 and R-204. Summing amplifier U-206 is also shunted by a conventional feedback resistor R-205. This amplifier circuit may be modified by inserting C-207 across its input and output terminals during periods when the bearing servo is in its search mode as distinguished from the presently described track mode. This will be described in connection with the apparatus shown in FIG. 3.

The output voltage from amplifier U-206, which is proportional to the simulated ground range $GR_{as}$ between the simulated aircraft and the simulated station, may be applied through a resistor R-208 to a conventional position servo, hereinafter known as the ground range servo, to provide a shaft position commensurate with $GR_{as}$. This shaft position may be used to position the wiper on potentiometer R-123 which provides a feedback circuit for U-105 in FIG. 1.

The specific coordinate converter thus far described in connection with FIGS. 1 and 2, as operating in the tracking mode, is largely conventional and numerous substitute devices may be used in practicing the invention. The bearing quantity $\psi_{as}$ is a prime input to many of the radio navigation indicators simulated in modern grounded aircraft trainers. Another prime quantity is one commensurate with slant range $SR_{as}$ between the simulated aircraft and the simulated radio station. Accurate and economical computing means for deriving this latter quantity from inputs commensurate with ground range $GR_{as}$ and the simulated altitude of the simulated aircraft above ground have been disclosed in copending patent application No. 540,070 of John M. Hunt filed October 12, 1955, and assigned to the same assignee as the instant invention. Therein slant range is computed by mechanizing the following equation:

$$SR_{as} = GR_{as} + \frac{h^2}{SR_{as} + GR_{as}} \quad (2)$$

Following this computational technique a voltage commensurate with the simulated altitude of the simulated aircraft above ground, $h$, is applied to input terminal 285 of FIG. 2. This voltage is applied to the input of summing amplifier U-220 through summing resistor R-219. Connected to the output of summing amplifier U-220 is a well known diode function generator which serves to shape the output voltage of the amplifier. The diode function generator comprises resistors R-224, R-225, R-226, R-227, R-228, R-229, R-230, R-231, R-232, and diodes D-224, D-225, D-226 and D-227. These components are arranged in a circuit with feedback resistors R-221 and R-222 such that the individual diodes conduct at step values of the input voltage to the summing amplifier to maintain its output at a value commensurate with the square of the altitude, $h^2$.

The quantity $h$, altitude above the ground, is a standard computer quantity in grounded flight trainers and often is available as both a voltage and a shaft position. Thus, even though a diode function generator has been disclosed herein as a means for obtaining the quantity, $h^2$, a number of other techniques are available. By way of example, a shaft position commensurate with $h$ may be used to linearly position a wiper on a potentiometer shaped according to a square function. Another alternative is to use a voltage commensurate with $h$ to excite a linear potentiometer with the wiper being linearly positioned by a shaft position commensurate with $h$.

In FIG. 2, the voltage commensurate with $h^2$ is applied to the input of amplifier U-233 through summing resistor R-223. A conventional D.C. analog division technique is employed in which the input voltage $h^2$ is divided by the sum of the ground range $GR_{as}$ and the slant range $SR_{as}$. This technique requires the use of two variable feedback circuits in parallel between the output and the input of the summing amplifier U-233. The first variable feedback comprises potentiometer R-235 connected from the output to ground and a wiper positioned by a shaft position commensurate with ground range $GR_{as}$. The wiper is connected through summing resistor R-234 to the input of the summing amplifier U-233. The second variable feedback comprises potentiometer R-236 connected from the output to ground and a wiper positioned by a shaft in accordance with slant range $SR_{as}$. This wiper is connected through summing resistor R-237 to the input of the summing amplifier U-233.

The input to U-233 from R-234 is proportional to $X \cdot (GR_{as})$ and the input to U-233 from R-237 is proportional to $X \cdot (SR_{as})$. Summing these inputs with $h^2$ from R-223 will yield an equation $$h^2 + X \cdot (GR_{as} + SR_{as}) = 0$$

which indicates that the output of summing amplifier U-233 must be proportional to $$X = \frac{h^2}{GR_{as} + SR_{as}}$$

The sign of this term may be made positive by inserting a polarity inverting amplifier beyond the feedback terminals of U-233, but in the usual case will be positive by virtue of a negative input to U-233 of $(-h^2)$.

The voltage output of U-233 may be applied through summing resistor R-251 to amplifier U-252 where it will be summed with the voltage output of U-206 through closed contact 275 and summing resistor R-288 to amplifier U-252. The output of amplifier U-252 will be proportional to $$GR_{as} + \frac{h^2}{GR_{as} + SR_{as}}$$

which equals the slant range $SR_{as}$ (Equation 2) and will operate the slant range servo in its tracking mode accordingly.

In addition to the D.C. summing amplifier U-252 the exemplary slant range servo comprises a magnetic amplifier A-255, a two phase A.C. servomotor M-256, a tachometer T-257, a follow up potentiometer R-240 and a tachometer potentiometer R-224. The potentiometer R-224, as shown in FIG. 2, is connected in parallel across the output terminals of the tachometer. The operation of the magnetic amplifier A–255 may be conventional, since its function is simply to take the D.C. voltage output from amplifier U–252 and control the magnitude and phase of the A.C. voltage applied to the control winding of the conventional two phase servo motor M–256. The reference winding of servomotor M–256 and the power input of the magnetic amplifier A–255 may be connected to the trainer A.C. power source (not shown). While the range portion of the Tacan system is in its tracking mode, the slant range servo operates as a position servo and positions its output shaft 276 in accordance with the output voltage from U–252, which is commensurate with the slant range between the simulated radio station and simulated aircraft. The follow up or rebalancing step is provided by the output shaft 276 developing a voltage commensurate with its position by positioning a wiper on potentiometer R–240 which is energized by a constant voltage from the trainer D.C. voltage power supply. The voltage on the wiper of R–240 is applied through closed relay contact 271 and summing resistor R–250 to the input of U–252 in the conventional manner for position servos. The summing amplifier also utilizes the conventional feedback resistor R–253. During the tracking mode of operation, a portion of the D.C. rate voltage appearing at the terminals of tachometer T–257 (driven by shaft 276) is picked off at the wiper of parallel potentiometer R–224 and applied through closed relay contact 272 and summing resistor R–259 to the input of the summing amplifier U–252 thereby providing rate stabilization.

When simulated conditions of radio reception are such that the range portions of the Tacan system should be in a searching mode a range search relay 301, which will be described in greater detail below in connection with FIG. 3A, closes relay contacts 273 and 270B while opening relay contacts 270A, 271, 272 and 275. During this mode of operation a constant D.C. voltage is applied via a voltage divider made up of resistor R–262 and R–261 to the input of summing amplifier U–252 through closed relay contact 270B and summing resistor R–251. During this mode of operation the amplifier U–252 in turn energizes servo motor M–256 through magnetic amplifier A–255 to drive slant range shaft 276 at a desired constant rotational velocity in one direction. Because relay contact 273 is closed and relay contact 272 is open during the search mode, the voltage output from tachometer T–257 is fed through summing resistor R–260 to the input of amplifier U–252 such that the overall operation of the slant range servo is that of a conventional velocity servo responding to a constant input voltage.

The discussion prior to the last paragraph has concerned the tracking mode of operation only. The searching mode requires that other matters be considered besides those touched upon, such as the transition between the tracking mode and the searching mode during which transition it is necessary that both the bearing servo and the slant range servo operate in a particular manner in order to provide realistic inputs to simulated indicators of a simulated Tacan system. Those portions of both FIG. 1 and FIG. 2 dealing with the proper operation of the bearing servo and the slant range servo during this transition will be discussed in more detail below in connection with the conditions which prevail when the transition is made. As already suggested above, several distinct conditions relating to Tacan signal propagation may prevent the slant range and/or the bearing portions of a Tacan receiver system from receiving the appropriate signal even though the receiver is switched to the On position. These conditions may be defined as (1) when either the range or bearing portion is detuned; (2) when either the range or bearing portion of the Tacan receiver has exceeded the line of sight of the transmitted signal; and/or (3) when either the range or bearing portion of the Tacan receiver system is in the cone of silence for the transmitted signal carrying that information.

FIG. 3A is illustrative of a relay system which may be used to simulate the effect of each of these three conditions of radio reception in order to properly simulate the system, whether the slant range and bearing portions of a Tacan system are in the search or tracking mode. This relay circuitry may vary greatly as a matter of choice. However, in a preferred embodiment of the present invention the energization of relay 301 serves to switch and maintain the simulated slant range portions of the simulated Tacan system in their searching mode, while the energization of relay 303 serves to switch and maintain the simulated bearing portions of the simulated Tacan system in their searching mode.

FIG. 3A is shown with all its relay contacts open. This condition corresponds to that previously shown in FIGS. 1 and 2 which showed the status of the switches and relays when both the bearing and range portions of the invention are in their tracking mode. It should be noted that all the relays and switches are labeled according to the function causing them to move to the position shown. As an example, switch 305 is shown in its open position which corresponds to the label Receiver "Off."

Switch contact 305 may be suitably ganged with switches 135 and 464 so that closing one of them will close all three and turn all portions of the circuit "on." When contact 305 is closed the A.C. voltage indicated at the extreme left terminal of FIG. 3A energizes winding 306 of a conventional timing motor 307 from the trainer A.C. power source. The timer motors used in the present invention may be either D.C. or A.C. motors depending upon the choice of the designer. Timer motor 307 may be selected as a type which will close a switch contact 308 after 90 seconds of simulated Tacan receiver warm up time.

When switch contact 308 is closed an additional power source (A.C. or D.C. depending on design choices) may be connected through any one of a first set of parallel relay contacts, if any of them are closed, to energize a winding 311 of a slant range search timing motor 309 and any one of a second set of three parallel relay contacts, if any of them are closed, to energize a winding 312 of a bearing search timing motor 310. If one or more of contacts 325, 347 or 358 is closed, coil 311 will be energized and motor 309 will run. After timing motor 309 runs for 10 seconds it will act to close switch 313 and connect range search relay 301 to a power source shown herein as the trainer D.C. power supply. Likewise, if one or more of contacts 326, 348 or 359 is closed, coil 312 will activate motor 310 and after timing motor 310 runs for 2 seconds, it will act to close switch 314 and connect bearing search relay 303 to a power source also shown herein as the trainer D.C. power supply. The range search relay 301 may also be connected to the D.C. trainer power supply by relay contact 315 which is in turn closed by the operation of the $SR_{as}$ servo error relay 245 shown in FIG. 2 thereby preventing the simulator from switching from the range search mode to the range tracking mode until the $SR_{as}$ servo error ceases to exist. The bearing search relay 303 may also be connected to the D.C. trainer power supply by relay contact 316 which will be closed except when the bearing shaft position is in the correct sector (see FIG. 3F) and will be opened by the operation of a correct sector relay the operation of which will be described in connection with FIG. 3F.

When a Tacan receiver system is turned on but is either detuned or the craft in which the receiver is mounted moves beyond the Tacan signal line of sight or within the signal cone of silence the receiver system should be switched from its tracking mode to its search mode.

When the Tacan system is used to provide a determination of both bearing and slant range all the information is received on a single carrier frequency and only one tuning control is required at the receiver. FIG. 3B shows a simplified tuning circuit illustrative of a technique useful in simulating the tuning steps of a Tacan system. Such tuning circuitry is conventional in radio aid training devices and may be considerably more elaborate than that shown in FIG. 3B. FIGS. 20–24 of Patent Number 2,709,308 referred to above are illustrative of such apparatus.

As shown in FIG. 3B, the transmitter tuning unit 318 may be located at the instructor's station while the receiver tuning unit 319 may be located at the student's station. Conducting arm 320, which may be positioned by control knob 321, in accordance with the frequency selection made by the instructor is arranged to cooperate with a plurality of contacts in circular array. Conductor arm 322, which may be positioned by control knob 323 in accordance with the frequency selection made by the student, is arranged to cooperate with a plurality of contacts in circular array. Each of the contacts of receiver tuning unit 319 is connected with the symmetrically corresponding contact of the transmitter tuning unit 318 through a plurality of leads. Thus, when the control knobs 323 and 321 are positioned to electrically cooperate with corresponding contacts the Tacan receiver system is tuned and a complete circuit exists between the D.C. trainer supply voltage, through conducting arm 320, through the selected connecting lead, through conducting arm 322 and through tuning relay 324 to ground. As long as tuning relay 324 is energized, relay contacts 325 and 326 of FIG. 3A will be open and the timing motors 309 and 310 will not be capable of energization through these contacts to switch the bearing servo and slant range servo into the search mode from the tracking mode.

FIG. 3C discloses analog computer circuitry for determining when a simulated aircraft carrying simulated Tacan receiving equipment has exceeded the signal line of sight or the maximum Tacan signal range. For the frequency range used by the Tacan system, and in comparatively flat terrain, the signal line of sight may be approximately computed by solving the following equation:

Maximum line of sight (ground range)
$$= 1.07 \sqrt{\text{altitude}} \quad (3)$$

The maximum Tacan signal range may be selected for simulation purposes as any value which would correspond to a slant range of 200 miles, the usual maximum range for Tacan range indicators. To detect a condition when the simulated aircraft carrying a simulated Tacan receiver system has exceeded the signal line of sight, a voltage commensurate with the altitude of the simulated aircraft above ground, which is a conventional grounded trainer quantity, may be applied to the input of summing amplifier U–330 through terminal 330 and summing resistor R–330. The output terminal of summing amplifier U–330 is prevented from exceeding a voltage commensurate with the square root of the altitude of the simulated aircraft above ground by the operation of an appropriately biased diode function generator comprising resistors R–334, R–335, R–336, R–337, R–338, R–339, R–340, R–341 and R–342 and diodes D–334, D–335 and D–336 and D–337 coacting with resistors R–331 and R–332. The shaping of the output voltage here is very similar to that shown in FIG. 2 in connection with summing amplifier U–220. The alternate techniques suggested above in reference thereto have application here when modified to provide the square root rather than the square of the altitude quantity.

The output voltage from U–330, commensurate with $\sqrt{h}$, is applied to the input of stabilization amplifier U–343 through summing resistor R–333 in opposition of a voltage commensurate with ground range $GR_{as}$ of reverse polarity applied thereto through terminal 329 and summing resistor R–329. Providing that the selection of the magnitude of summing resistors R–329 and R–333 considers the constant 1.07, the input voltages applied to stabilized amplifier U–343 are identical with the left and right hand sides of Equation 3 above. As those skilled in the art will recognize, if the voltage commensurate with ground range $GR_{as}$ is greater than 1.07 times the voltage commensurate with the square root of the altitude, the signal line of sight will be exceeded and the amplifier U–343 will receive a net input voltage. Diode D–344 connected to the output of U–343 will transmit current only if the voltage from terminal 329 exceeds the voltage from the output terminal of U–330 and not otherwise.

When the signal line of sight is exceeded, the signal line of sight relay 346 will be energized and its contacts 347 and 348 will be closed. When the line of sight relay 346 of FIG. 3C is operated and its contacts 347 and 348 are closed, timing motors 309 and 310 will be energized as a first step in switching the bearing servo and slant range servo into the search mode from the tracking mode.

As indicated above, even though the aircraft carrying a Tacan receiver has not gone beyond the signal line of sight it may have exceeded the maximum signal range measurable by the instruments. In order to simulate this feature a third D.C. voltage may be applied to the input of summing amplifier U–343 with the proper polarity and magnitude to actuate relay 346 when this condition exists. Such a function may be provided by switch 350, which is positioned to be closed by the ground range servo shaft when the ground range exceeds a value which would roughly correspond to a slant range of over 200 miles or any maximum signal range which it is desired to simulate. Accurate simulation of a particular maximum range is not required for realism inasmuch as the magnitude is subject to many marginally predictable variables and cannot be definitely established except under known atmospheric conditions. When switch 350 is closed a constant D.C. potential is applied to the input of amplifier U–343 through summing resistor R–328 to operate relay 346 and close contacts 347 and 348. As indicated in the preceding paragraph, the closure of contacts 347 and 348 will start a chain of events which can switch both the bearing and the range portions of the simulator from their tracking to their searching modes. This chain of events involves providing a path through contacts 347 and 348 for current, which will activate motors 309 and 310, which in turn will close contacts 313 and 314, which will operate relays 301 and 303, which in turn will operate a number of contacts in FIGS. 1 and 2 which determine whether the apparatus functions in its search mode or its track mode.

If the bearing portion of the Tacan system should be in the search mode instead of the track mode, relay 303 will operate relay 301 after a short delay to close relay contacts 130B, 140 and 142 in FIG. 1, while opening relay contacts 130A and 141. During this mode of operation, a constant D.C. voltage is applied via a voltage divider made up of resistor R–117 and resistor R–118 through closed relay contact 130B and through resistor R–119 to the input of amplifier U–112, which in turn energizes servo motor M–101 through the magnetic amplifier A134 to drive bearing shaft 138 at a desired constant rotational velocity in a counterclockwise direction. Because relay contact 142 is closed and relay contact 141 is open during the search mode of operation, the voltage output from tachometer T–101 is fed through resistor R–120 to the input of amplifier U–112 so that the overall operation of the bearing servo is that of a conventional velocity servo responding to a constant input voltage.

The Tacan signal propagation pattern like most of the radio navigational aids, has an area above the radio station (beacon) where the signal level is below a usable strength. Moreover, because of the nature of the signal intelligence this area may differ in size depending on whether the bearing or range signal is being considered. These areas of low signal are known as the cone of silence and may vary according to the design of the particular types of Tacan equipment as it is altered between models and manufacturers. By way of example, a vertical cone directly above the Tacan station with a vertex angle of 40 degrees may be selected as a typical cone of silence for slant range intelligence and a similar vertical cone directly above the Tacan station with a vertex angle of 60 degrees may be selected as a typical cone of silence for bearing intelligence.

In order to simulate the effects of these cones of silence analog circuitry must be provided to energize relay 356 (FIG. 3D), thereby maintaining the cone of silence relay contact 358 of FIG. 3A in the open position for so long as the position of the simulated aircraft remains outside a 40 degree cone with respect to the Tacan station and to energize relay 357 (FIG. 3E), thereby maintaining the cone of silence relay contact 359 (FIG. 3A) in the open position for so long as the position of the simulated aircraft remains outside a 60 degree cone.

Referring to FIG. 3D, the circuitry shown may be designed so that a voltage of a desired polarity appears at the output of amplifier U–352 whenever the simulated aircraft carrying the simulated Tacan receiving equipment is outside the 40 degree bearing cone of silence. Amplifier U–352 receives an input voltage commensurate with the ground range quantity $GR_{as}$ at input terminal 348' and through summing resistor R–348 in parallel with an input voltage of opposite polarity commensurate with the altitude quantity $h$ at input terminal 349 and through summing resistor R–349. These summing resistors are scaled in a manner such that when the voltages are of a magnitude which indicates that the simulated aircraft is passing through the 40 degree cone of silence the resultant voltage at the input of the amplifier U–352 is equal to zero. Furthermore, as the simulated aircraft travels farther into the cone of silence it is desirable that the voltage output of the amplifier be of opposite polarity to that existing when the simulated aircraft is outside the 40 degree cone of silence. If the voltage inputs at terminal 348' and terminal 349 have a plus and minus polarity respectively, and diode D–352 is connected as shown, the relay 356 will be operated to keep contact 358 open only when the simulated aircraft is outside the cone of silence.

FIG. 3E illustrates a circuit which operates in a similar fashion to that shown in FIG. 3D, except that the scaling of summing resistors R—350 and R–351 is such that the sum of the input voltages to amplifier U–353 is zero and contact 359 is closed when the voltages at terminals 350 and 351 indicate that the simulated aircraft is passing through the 60 degree cone of silence (instead of the 40 degree cone of silence). Similarly to FIG. 3D, the voltage output from amplifier U–353 is positive whenever the simulated aircraft is outside the 60 degree cone of silence and relay 357 is energized through D–353 and resistor R–355 to keep contact 359 open.

The computation technique utilized for determining whether or not the simulated aircraft is within the cone of silence may vary greatly as a matter of choice. For example, one computing circuit might be substituted for FIGS. 3D and 3E which computes the tangent of the elevation angle of the simulated aircraft from the Tacan station and provides further plural relay means responsive to the tangent quantity when the elevation angle corresponds to a simulated aircraft position outside the 40 and 60 degree cone.

It is important in the simulation of the operation of a Tacan system that the indicators receiving inputs therefrom give a realistic simulation of the transition between the tracking and the searching mode and vice versa for both the bearing and range portions. It will be recalled that the bearing portions of a Tacan system operate in a manner such that the pointer on the RMI indicator is rotated counterclockwise at a constant rate of about 4–6 revolutions per minute during the searching mode, and that when the Tacan receiver receives bearing information the system switches to the tracking mode and the pointer continues to rotate counterclockwise until it reaches its proper position. The present invention teaches a technique for simulating this transition by utilizing an additional switching circuit shown in FIG. 3F, which in cooperation with the correct sector relay contact of FIG. 3A and the rectangular to polar coordinate conversion and bearing servo of FIG. 1 assures that the pointer moves counterclockwise until it reaches the proper position.

In this connection, switches 140, 130, 141 and 142 (FIG. 1) remain in the positions shown until the bearing search relay 303 (FIG. 3A) is energized at which time they reverse. Reversal of these switches places the simulated Tacan bearing system in its search mode. The bearing servo is switched to operate as a velocity servo in order to rotate the bearing shaft 138 at a constant speed counterclockwise in response to a D.C. voltage from a voltage divider comprising R–117 and R–118. During this period, summing amplifier U–105 continues to receive voltage inputs from resolvers R–135 and R–136, respectively. The feedback to amplifier U–105, while the bearing servo is in its search mode, is through R–115, R–116 and R–123. The circuitry shown as resistors R–124, R–125, R–126, R–127 and diodes D–128 and D–129 serves to limit the feedback to U–105 within certain limits. Since shaft 138 is rotating counterclockwise at a constant speed and the position is no longer equal to $\psi_{as}$, the two cyclically varying voltages being fed to U–105 from resolvers R–135 and R–136 may be represented as $X_{as} \sin W$ and $Y_{as} \cos W$, respectively, where $W$ is equal to the instantaneous angle that the shaft position 138 makes with respect to its reference north position. Moreover, the algebraic summation of these two quantities, representing simple harmonic voltage variations, may be represented by the following equation:

$$X_{as} \sin W + (-Y_{as} \cos W)$$
$$= \sqrt{X^2_{as} + Y^2_{as}} \sin \left( W - \tan^{-1} \frac{-Y_{as}}{X_{as}} \right)$$

by the direct application of a well known trigonometric identity. Thus the output of summing amplifier U–105 during the searching mode may be represented by the right hand side of Equation 4.

In order for the pointer of an RMI indicator driven indirectly by shaft 138 to continue to rotate counterclockwise during the transition between the searching and tracking modes until it gives a proper indication of the direction of the simulated Tacan station from the simulated aircraft $\psi_{as}$, it is necessary that a detection circuit such as that shown by FIG. 3F be provided to detect the exact moment that shaft 138 is in registry with the instantaneous bearing $\psi_{as}$. FIG. 3G, is provided to graphically describe the operation of such a detection circuit with the center of the circle representing the shaft 138 and the circumference representing the 360 degrees through which it may be positioned. The portion of the circumference marked "correct sector" is arbitrarily selected as an instantaneous bearing $\psi_{as}$ at which it is desired for the shaft 138 to stop rotating. The size of the pie shaped correct sector is determined by the sensitivity of the detection circuit, the velocity of rotation of the shaft 138, and the switching time required for the transit of the bearing servo from the searching to the tracking mode. The detection circuit must provide means to determine when the position of shaft 138 is in any of the other sectors shown in FIG. 3G in order that the transition does not take place during those times.

Referring again to FIG. 1, the output of summing amplifier U–105 will be commensurate with the right hand side of Equation 4 during the search mode, and will be of negative polarity as the position shaft 138 passes through the negative sector and of positive polarity as the position of shaft 138 passes through the positive sector. Thus negative sector relay 158 is energized through diode D–158 as the position of the shaft 138 passes through the negative sector, and the positive sector relay 157 is energized through diode D–157 as the position of the shaft 138 passes through the positive sector. When the position of shaft 138 corresponds to the instantaneous simulated bearing of the simulated Tacan station from the simulated aircraft $\psi_{as}$, the output voltage from summing amplifier U–105 will be zero, indicating that the shaft is passing through the correct sector. Inspection of Equation 4 will indicate that U–105 will also have a zero output voltage when the position of shaft 138 is exactly 180 degrees from the instantaneous value of $\psi_{as}$, thereby accounting for the sector diametrically opposite the correct sector of FIG. 3G. Thus it is possible that the position of the shaft 138 would be in this latter sector at the moment that all other conditions considered by the switching means of FIG. 3A indicate that the bearing portion of the simulated Tacan receiver system should be switched to its tracking mode and the switch of mode would take place in an unrealistic manner. This may be avoided by detecting the passage of the position of shaft 138 through what may be called the back sector.

The back sector is shown in FIG. 3G in the relative position it maintains with the station bearing $\psi_{as}$. The passage of shaft 138 through this sector during search may be detected by taking the output voltage from resolver R–135, which is commensurate with $X_{as} \cos W$ and the output voltage from resolver R–136, which is commensurate with $Y_{as} \sin W$, and feeding them to amplifier U–153 through summing resistors R–151 and R–152, respectively, to solve an equation similar to Equation 4 as set forth above except that it is shifted by 90 degrees. In a manner similar to that described above in connection with the positive and negative sectors, this arrangement provides for the detection of the passage of the position of shaft 138 through the back sector by deriving a positive output voltage at the output of amplifier U–153, which in turn energizes back sector relay coil 154 through the diode D–154. Thus, if the position of shaft 138 is passing through the correct sector, neither the negative sector, the positive sector nor the back sector relays will be energized.

In order to detect the passage of the position of shaft 138 through the correct sector a correct sector relay 375, shown in FIG. 3F, may be energized from the grounded trainer D.C. power supply through relay contacts 376, 377 and 378 connected in series. If the position of the shaft is through any of the sectors except the correct sector one of these relay contacts will be opened and the correct sector relay will be de-energized to allow contact 316 to open. Relay contacts 376, 377 and 378 are opened by the energization of negative sector relay 158, positive sector relay 157 and back sector relay 154, respectively. As a result, the switching circuitry of FIGS. 3A and 3F, and the detecting means shown in FIG. 1 operate in a manner such that the correct sector relay contact 316 is closed except when the position of shaft 138 is through the correct sector, and the bearing search relay 303 will remain energized even though the other simulation conditions affecting the receipt of Tacan information are such that the simulated bearing receiver system should switch to its tracking mode and relay contact 314 is opened. In this way shaft 138 always rotates in the search direction and at the search velocity to the correct sector before the transition to the tracking mode takes place. It should be noted that the position of shaft 138 is in the correct sector and relay contact 316 is open during the entire time that the bearing portion of the simulated Tacan receiver system is in the tracking mode.

Even during the periods when the bearing portions are in their search mode, it is important to compute the ground range $GR_{as}$. Since the nature of the range signal transmission is different from the bearing signal transmission in Tacan systems, a difference which is exemplified by a different cone of silence pattern for each, it is possible to have the bearing servo in a search mode at the same time that the range portions are in a tracking mode. Consequently, the computing means for stimulating a complete Tacan receiver system must provide for the computation of both ground range $GR_{as}$ and slant range $SR_{as}$ even while the simulated bearing portions are in the search mode.

Referring to FIG. 2, in order for the conventional ground range servo to perform its function it must receive input voltages via terminals 201 and 202 commensurate with $Y_{as} \sin \psi_{as}$ and $X_{as} \cos \psi_{as}$ respectively. While this condition is satisfied when the simulated bearing portions are in their tracking mode, this is not so when the bearing portions are in the search mode except during those short periods when the shaft 138 is passing through the correct sector. In order to satisfy this condition, a capacitor C–207 and a feedback resistor R–205 are provided which may alternately be placed in parallel with summing amplifier U–206 through relay contact 284a and 284' respectively. When the bearing system is in its track mode, or shaft 138 is passing through the correct sector, the correct sector relay will maintain contact point 284' in its closed position and connect the capacitor C–207 to ground through contact 284b, thereby providing for normal operation of amplifier U–206 while at the same time charging capacitor C–207 to a voltage commensurate with the ground range $GR_{as}$. When the bearing system operates in its searching mode, correct sector relay 375 will be de-energized during the periods in which shaft 138 is passing through the negative sector, the positive sector and the back sector and contact 284' will be opened to remove R–205 from the amplifier circuit at the same time that contact 284a is closed and condenser C–207 (which is charged to a voltage proportional to $GR_{as}$) is across the terminals of amplifier U–206. The charge on condenser C–207 will provide a "memory" for the input of U–206 enabling the amplifier to continue to provide an output proportional to $GR_{as}$ until such time as shaft 138 again passes through the correct sector and connects contacts 280 and 282 to provide the required input to U–206 from contacts 201 and 202. The action of correct sector relay contacts 280 and 282 controlled by relay 375 and bearing search relay contacts 281 and 283 controlled by relay 302 is to provide a corrected input voltage to U–206 once every revolution of shaft 138.

Thus far, nothing has been specifically set forth concerning the presentation of the prime quantity commensurate with simulated slant range $SR_{as}$. As described above in connection with FIG. 2, the slant range servo operates as a position servo when connected to operate in a tracking mode as shown therein. Moreover, when simulated conditions are such that the slant range servo should operate in its searching mode, relay contacts 275, 271, 270A and 272 are opened and relay contacts 270B and 273 are closed by the operation of range search relay 301 (FIG. 3A) such that the slant range servo then operates as a velocity servo in response to a constant voltage to rotate the slant range shaft 276 in a direction such as to repeatedly position the indication of a distance measuring indicator (counter) 290 from zero through a maximum range (passing through zero immediately before again increasing the range indication to the maximum). Thus, the simulated range search indication is the same as that provided by the range indication means of the real Tacan system during the search mode.

When the simulated conditions are such that the slant range servo should switch to its tracking mode, it is important for realistic simulation that the shaft 276 continue in the searching mode from a zero distance indication to the appropriate slant range indication rather than take the shortest direction of rotation to that indication. In order to provide such operation, an additional relay contact 315 is placed in parallel with the range search actuating contact 313 so that range search relay 301 will continue to be energized by the trainer D.C. power supply even after simulated conditions are such that the range portions should switch to the tracking mode and after relay contact 313 is opened. To provide this function a relay 245 in FIG. 2 detects the condition when the value determined by the slant range servo shaft 276 corresponds to the instantaneous slant range between the simulated Tacan station and the simulated aircraft. It should be noted that this condition can never occur when the instantaneous slant range, $SR_{as}$, exceeds the maximum range indication of the indicator. For the purpose of detecting this condition a voltage commensurate with the position of shaft 276 is provided at the wiper of potentiometer R-240 and applied to the input of the summing amplifier U-241 through R-239 in opposition to voltages commensurate with the two components of instantaneous slant range which have been described above. The component commensurate with the ground range $GR_{as}$ is fed to U-241 through summing resistor R-237 and the component commensurate with the error term $$\frac{h^2}{SR_{as}+GR_{as}}$$

is fed to U-241 through summing resistor R-238. When the sum of the voltages fed through R-237 and R-238 is equal and opposite in polarity to the voltage fed through R-239, the condition of correspondence between the value shown by the slant range indicator 290 and the derived instantaneous slant range is satisfied, and the switch from the search mode to the tracking mode will take place in a realistic manner. On the occurrence of this condition, the output of U-241 is zero and $SR_{as}$ relay 245 is de-energized and relay contact 315 of FIG. 3A will be open as illustrated.

During those times when the sum of the inputs to U-241 is not zero, relay contacts 315 will be closed, so that the transition from the search to the tracking mode is prevented. It should be noted that during the tracking mode, shaft 276 is positioned in accordance with slant range $SR_{as}$ and therefore relay 245 remains de-energized and relay contact 315 remains open.

It is important that the detection of a zero $SR_{as}$ error voltage not be subject to variations in sensitivity, therefore additional diode circuitry comprising resistors R-242, R-243, R-246, R-247, R-248 and R-249 and diodes D-242 and D-243 is provided in the circuit arrangement shown to provide a broad zero voltage output for U-241. This detection circuit for the appropriate operation of relay 245, helps the shaft 276 always increase its range indication to the correct slant range during the transition from the search to the tracking mode.

The detailed description, set forth above, has dealt with the derivation of quantities commensurate with the slant range by means of a slant range servo and/or the bearing by means of a bearing servo between the Tacan station and the simulated aircraft for presentation to the student pilot when the appropriate portion of the Tacan receiver system is in its tracking mode. Moreover, means are disclosed for driving both the slant range servo and the bearing servo outputs in an appropriate manner during the search mode for that portion of the simulated Tacan receiver system. In the simulation of flight for radio navigation training purposes it is the simulation of the indications on the Tacan instruments which provides a sense of realism to the student.

One of the instruments, known as the course deviation indicator, comprises a vertical needle movable to the left or right from a neutral position in a manner such that the position of the needle relative to the neutral position is an indication of the location of the aircraft relative to a manually selected magnetic radial from the station. To solve the ambiguity as to whether the aircraft is tracking along a selected radial toward or away from the radio station a "To-From" indicator is provided in addition to the needle.

Referring to FIG. 4A, a synchro transmitter 401 is shown comprising a rotor winding 403 which is energized by the trainer A.C. power supply and two stator windings 404 and 405 displaced 90 degrees from each other. If rotor winding 403 is positioned by a shaft in accordance with the output of the bearing servo (which is commensurate with the bearing $\psi_{as}$ of the simulated Tacan station from the simulated aircraft during the tracking mode and with search bearing W during the search mode) the voltage induced in stator windings 404 and 405 will be commensurate with the simulated bearing. These stator windings are connected to corresponding windings 407 and 406, displaced by 90 degrees on the rotor of a synchro differential 402, which also has two stator windings 408 and 409 which are displaced by 90 degrees. One terminal of each of the windings 406, 407, 408 and 409 is grounded as indicated in FIG. 4A. An electromagnetic field, commensurate with that generated by transmitter 401, is reproduced at synchro differential 402 by rotor windings 406 and 407. Moreover, if the rotor is positioned in accordance with the magnetic variation by the instructor at the instructor's station, the voltages induced in stator windings 408 and 409 will be commensurate with the magnetic bearing of the Tacan station from the simulated aircraft and an electromagnetic field will be set up by the rotor windings 411 and 412 of the synchro differential 410. The rotor windings 411 and 412 are physically oriented 90° from one another and are connected to windings 408 and 409, respectively.

If the rotor of synchro differential 410 is positioned by the student pilot according to his selection of a magnetic radial with respect to which he wishes to know his direction, the electro-magnetic field of the rotor windings 411 and 412 is commensurate therewith. The rotor windings 411 and 412, and the stator windings 413 and 414 each have one terminal connected to ground. Since stator windings 413 and 414 are physically oriented 90 degrees from one another, the operation of synchro differential 410, which generates a resultant electro-magnetic field commensurate with the difference in the magnetic bearing of the Tacan station and the selected magnetic radial, may also be described as that of a sine-cosine receiver in which a voltage commensurate with the sine of the difference between the angles is induced in winding 414 and a voltage commensuate with the cosine of the difference between the angles is induced in winding 413. Synchro transmitter 401 and synchro differential 402 have been shown as using synchros of the two winding type, whereas they might well be of the more conventional three winding type such as are shown in FIG. 4B.

The voltage commensurate with the sine of the difference angle, which is induced in winding 414, is proportional to the deviation of the instantaneous magnetic bearing of the Tacan station from the simulated aircraft from the selected magnetic radial. The magnitude and direction of the deviation may be displayed to the student pilot on appropriate instruments such as that shown at 422. This involves applying the A.C. voltage induced in winding 414 through resistor R-417 and a conventional linear demodulator shown by block 418, which converts its A.C. input to a D.C. voltage having a magnitude proportional to the input magnitude and a polarity dependent upon the phase of the input voltage. The D.C. voltage is applied to a coil 421 which operates to turn a needle 422, thereby indicating the magnitude and direction of the deviation from the selected radial. The relationship of coil 421 to position needle 422 may be that of the corresponding elements in a galvanometer.

The voltage induced in winding 413 is also indicative as to whether or not the bearing of the Tacan station from the simulated aircraft is within 90 degrees of the selected radial. Those skilled in the art will recall that the cosine function is positive in the first and fourth quadrants and negative in the second and third quadrants. For that reason, the induced voltage on winding 413 is of one phase for so long as the difference angle remains within plus or minus 90 degrees indicating that the simulated aircraft is flying "To" the Tacan station, and it is of the opposite phase when the difference angle increases beyond plus and minus 90 degrees indicating that the simulated aircraft is flying "From" the Tacan station. The existence of either one of these conditions may be displayed to the student pilot by applying the A.C. voltage induced in winding 413 through resistor R–415 to appropriate indicators. In the apparatus shown the A.C. voltage is applied to a conventional linear demodulator shown by block 416, which converts the A.C. input to a D.C. output having a polarity in accordance with the phase of the input voltage. The D.C. output is applied to a coil 419 which operates a pointer 420 to indicate "To" or "From" at appropriate times.

When the apparatus is in the bearing search mode it is necessary that the "To-From" indicator change rapidly from "To" to "From." Referring to FIG. 4A, it is clear that during the search mode shaft 138 will rotate the rotors of synchro transmitter 401 in a counter clockwise direction to a constant velocity which in turn induces cyclically varying voltages in synchro differential 402 and synchro resolver 410. As a result, the "To-From" pointer will oscillate back and forth between its limits of movement and the vertical needle will oscillate between its limits of movement.

Referring now to FIG. 4B, we find a conventional radio magnetic indicator or RMI which will operate in response to the values derived previously in connection with this simulator. A movable coil, having an A.C. potential impressed across its terminals, is supplied at 423 and coupled to the Tacan bearing shaft 138 to induce potentials in the coils 424, 425 and 426 of a synchro 444 which may be said to operate as a synchro sender or torque transmitter. The potentials appearing on stator windings 424, 425 and 426 are transmitted to rotor windigs 427, 430 and 428 respectively which are a part of the rotor of a differential torque transmitter 445. The rotor winding of transmitter 445 is positioned in accordance with magnetic variation through a suitable shaft to provide potentials on stator windings 431, 432 and 433 which represent the algebraic sum or difference, of Tacan bearing and magnetic variation.

The output of the differential torque transmitter 445 is then applied across the windings 434, 436 and 435 which are wound on the rotor of a second differential torque transmitter 446. The rotor of differential torque transmitter 446 is positioned in accordance with aircraft magnetic heading $\psi_{ma}$ so that the potentials induced in the stator windings 437, 438 and 439 of the differential torque transmitter 446 represent the difference between the aircraft magnetic heading and the quantity represented on windings 431, 432 and 433. It will be recognized that this quantity will represent the magnetic bearing of the Tacan transmitter.

The windings 440, 441 and 442 of the torque receiver 447 will then force the pointer 449, on the face of the RMI dial, to a position representing the magnetic bearing of the Tacan transmitter. It will be recognized that rotatable winding 448 of the torque receiver 447 will have a suitable A.C. potential applied across its terminals. As indicated in FIG. 4B the RMI dial 450 is positioned by a shaft representing the aircraft magnetic heading $\psi_{ma}$ as was the differential torque transmitter 446. The reading on dial 450 will, in a conventional way, indicate the magnetic heading of the aircraft, and the position of the pointer 449 on said dial will indicate the magnetic bearing to the Tacan transmitter. It will be recognized that changes from the bearing track mode to the bearing search mode and back again will be reflected by the behavior of the RMI dial and the pointer 449.

In addition to the vertical needle and "To-From" indications the course deviation indicator contains a flag which may be in an "off" position to indicate that the stimulated aircraft is off course whenever one of several conditions prevails, such as when the Tacan receiver is not tuned, when the aircraft is within the 40° cone of silence for the bearing information signal, when the aircraft is beyond the signal line of sight for the bearing information, or when the Tacan receiver is not turned on. FIG. 4C shows circuitry by which the operation of this flag may be simulated. A voltage from the D.C. trainer power supply may be applied through a relay coil or a solenoid 463 through contacts 460, 461, 462 and 464 when they are all closed to ground, as shown in FIG. 4C, so that the "off" flag is moved to its On course or concealed position. If any one of these contacts is open the flag will drop to its visible position to indicate "off." Relay contact 460 may be closed by a tuning relay exemplified by relay 324 of FIG. 3B. The details as to how relay contact 460 is closed will depend on the particular design and complexity of the means used for the simulation of the tuning of a Tacan receiver.

The read outs or instruments described above (as well as the RMI dial 450 and the course deviator indicator 449) are only a few of the many aircraft instruments which have been or may in the future be used in connection with a simulated Tacan system. It should be clear that the teachings of the present invention with a bearing shaft and a slant range shaft operating in both the tracking and search modes under appropriate simulated conditions may serve as prime inputs to any instrument or read-out to which a real Tacan system might serve as an input.

It will thus be seen that the objects set forth above, among those made apparent from the preceding description, are efficiently attained. Since certain changes may be made in carrying out the teachings of this application without departing from the scope of this invention, it is intended that all matter contained in the above description or shown in the accompanying drawings shall be interpreted as illustrative and not in a limiting sense.

As an example of changes which would occur to those skilled in the art direct current computation has been used in the above disclosed embodiment, but the invention can be practiced using A.C. computation techniques with components adapted for that purpose. While the summing devices have been shown herein as comprising parallel-adding feedback amplifiers, differential synchros and mechanical differentials, a variety of equivalent summing devices well known to those skilled in the art may be readily substituted without departing from the invention.

The resistance resolvers shown in the disclosed embodiment have been shown as comprising linearly-actuated arms cooperating with tangential sinusoidal and co-sinusoidal function windings. However, the resolvers may utilize linear windings and trigonometric mechanical actuating means for the arms, such as scotch yoke, for example, for sine and cosine resolution.

Having described my invention, what I claim as new and desire to secure by Letters Patent is:

1. A grounded flight trainer including means for simulating the operational and presentation characteristics of a simulated airborne Tacan receiver mounted in a simulated aircraft comprising a shaft, an electro-mechanical shaft positioning means having two modes of operation, a searching mode whereby said electro-mechanical shaft positioning means operates as a velocity servo to rotate said shaft at a fixed angular velocity in response to a fixed voltage and a tracking mode whereby said electro-mechanical shaft positioning means operates as a position servo to position said shaft in response to an input voltage, means for detecting when said simulated aircraft is beyond the line of sight of the simulated radio station comprising means for deriving a first control voltage commensurate with the simulated ground range between said simulated radio station and said simulated aircraft, means for deriving a second control voltage commensurate with the square root of the simulated altitude of said simulated aircraft, and means responsive to said first and second control voltages for switching said electro-mechanical shaft positioning means to its searching mode whenever said first control voltage exceeds said second control voltage.

2. A grounded flight trainer including means for simulating the operational and presentation characteristics of a simulated airborne Tacan receiver mounted in a simulated aircraft comprising a shaft, an electromechanical shaft positioning means having two modes of operation, said modes including a searching mode whereby said electromechanical shaft positioning means operates as a velocity servo to rotate said shaft at a fixed angular velocity in respones to a fixed voltage and a tracking mode whereby said electromechanical shaft positioning means operates as a position servo to position said shaft in response to an input voltage, means for detecting when said simulated aircraft is in a cone of silence with respect to a radio station comprising means for deriving a first control voltage commensurate with the simulated ground range between said simulated radio station and said simulated aircraft, means for deriving a second control voltage commensurate with the simulated altitude of said simulated aircraft above ground and means responsive to said first and second control voltages for switching said electromechanical shaft positioning means to its searching mode whenever the relative values of said control voltages indicate that said simulated aircraft is in a cone of silence.

3. A grounded flight trainer including means for simulating the operational and presentation characteristics of a Tacan system comprising means for generating slant range signals and bearing signals representing range and bearing from a simulated aircraft to a simulated Tacan transmitter, means for providing a constant potential, a first shaft, means for simulating the operation of a Tacan system in a plurality of search modes and in a plurality of track modes including a first electromechanical shaft positioning means coupled to said first shaft and responsive to said bearing signals for deriving a first shaft position to represent the bearing track mode or responsive to said constant potential to rotate said first shaft to represent the bearing search mode, a second shaft, a second electromechanical shaft positioning means responsive to said slant range signals for positioning said second shaft in accordance with slant range to represent the slant range track mode or responsive to said constant potential to rotate said second shaft to represent the search mode or a search for the slant range, means for determining the presence of said simulated aircraft within a first cone of silence and for supplying said constant potential to said first electro-mechanical shaft positioning means to force it from its bearing track mode to its bearing search mode, means for determining the presence of said simulated aircraft within a second cone of silence and for supplying said constant potential to said second electro-mechanical shaft positioning means to force it from its slant range track mode to its slant range search mode, and indicating means for displaying the change over from one mode to another.

4. A grounded flight trainer including means for simulating the operational and presentation characteristics of a Tacan system comprising means for providing a signal proportional to the simulated altitude of the flight trainer, means for generating ground range signals, and means for generating slant range signals and bearing signals representing range and bearing from a simulated aircraft to a simulated Tacan transmitter, means for providing a constant potential, a shaft, means for simulating the operation of a Tacan system in a searching mode and in a tracking mode including a first electro-mechanical shaft positioning means responsive to said bearing signals for positioning said first shaft to represent the bearing track mode or responsive to said constant potential to rotate said shaft to represent the bearing search mode, a second shaft, a second electro-mechanical shaft positioning means responsive to said slant range signals for positioning said second shaft in accordance with slant range to represent the slant range track mode or responsive to said constant potential to rotate said second shaft to represent the slant range search mode or a search for the slant range, means for determining whenever said ground range exceeds the line of sight between said grounded flight trainer and the simulated Tacan transmitter, and means for switching said constant potential to the first and second electro-mechanical shaft positioning means to force said positioning means to operate in their search modes when said ground range exceeds said line of sight, said last named means operating to disconnect said constant potential from said first and second electro-mechanical shaft positioning means when said ground range once more lies within said line of sight.

5. A grounded flight trainer including means for simulating the operational and presentation characteristics of a Tacan system comprising means for providing a signal proportional to the simulated altitude of the flight trainer, means for generating ground range signals, means for generating slant range signals, means for generating bearing signals, said range and bearing signals representing range and bearing from a simulated aircraft to a simulated Tacan transmitter, means for providing a constant potential, means for simulating the operation of a Tacan system in a tracking mode including a first electro-mechanical shaft positioning means responsive to said bearing signals for deriving a first shaft position to represent the bearing track mode, means for simulating the operation of a Tacan system in a searching mode including said first electro-mechanical shaft positioning means responsive to said constant potential to rotate said shaft to represent the bearing search mode, a second shaft, a second electro-mechanical shaft positioning means responsive to said slant range signals for positioning said second shaft in accordance with slant range to represent the slant range track mode, said second electro-mechanical shaft positioning means responsive to said constant potential to rotate said second shaft to represent the slant range search mode or a search for the slant range, means for determining whenever said ground range exceeds the line of sight between said grounded flight trainer and the simulated Tacan transmitter and means for switching said constant potential to the first and second electro-mechanical shaft positioning means to force said positioning means to operate in their search modes when said ground range exceeds said line of sight.

References Cited in the file of this patent

UNITED STATES PATENTS

| | | |
|---|---|---|
| 2,532,158 | Ewing | Nov. 28, 1950 |
| 2,533,361 | Dehmel | Dec. 12, 1950 |
| 2,560,527 | Dehmel | July 10, 1951 |
| 2,560,528 | Dehmel | July 10, 1951 |
| 2,685,747 | Hicken | Aug. 10, 1954 |
| 2,709,308 | Frankel | May 31, 1955 |
| 2,715,782 | Cooper | Aug. 23, 1955 |
| 2,730,815 | Gallo | Jan. 17, 1956 |
| 2,744,339 | Paine | May 8, 1956 |
| 2,777,214 | Birmingham | Jan. 15, 1957 |
| 2,791,842 | Kennedy | May 14, 1957 |
| 2,811,788 | Gallo | Nov. 5, 1957 |
| 2,846,780 | Gallo | Aug. 12, 1958 |